United States Patent
Miksch et al.

[11] Patent Number: 6,160,250
[45] Date of Patent: Dec. 12, 2000

[54] INTEGRATED OPTICAL IMAGING ASSEMBLY

[75] Inventors: Eugene A. Miksch, Loveland; Thomas E. Berg, Fort Collins, both of Colo.

[73] Assignee: Hewlett-Packard Company, Palo Alto, Calif.

[21] Appl. No.: 09/283,342

[22] Filed: Mar. 31, 1999

[51] Int. Cl.[7] .............................. H01L 27/00; G06K 7/10; G06K 9/22; H04N 1/024
[52] U.S. Cl. .................. 250/208.1; 235/472.01; 235/462.45; 358/473; 382/313
[58] Field of Search ................................ 250/208.1, 234, 250/235; 358/473, 486; 235/472.01, 462.45; 382/313, 316, 317

[56] References Cited

U.S. PATENT DOCUMENTS

| | | | |
|---|---|---|---|
| 5,089,712 | 2/1992 | Holland | 250/557 |
| 5,306,908 | 4/1994 | McConica et al. | 250/234 |
| 5,381,020 | 1/1995 | Kochis et al. | 250/566 |
| 5,552,597 | 9/1996 | McConica | 250/234 |
| 5,578,813 | 11/1996 | Allen et al. | 250/208.1 |
| 5,586,212 | 12/1996 | McConica et al. | 385/146 |
| 5,814,803 | 9/1998 | Olmstead et al. | 235/462 |

*Primary Examiner*—Scott J. Sugarman

[57] ABSTRACT

An integrated optical imaging assembly for scanning an object may comprise a printed circuit board having an upper end and a lower end. An optical detector is mounted to the upper end of the printed circuit board at an end of an image light path, and a lens system is mounted to the printed circuit board below the optical detector to be interposed in the image light path. A reflector is mounted to the lens in the image light path between the lens and the optical detector to direct the image light path between the lens and the optical detector. An illumination source is mounted to the lower end of the circuit board to illuminate a second end of the image light path below the lens, and an illumination reflector is mounted to the lens opposite the illumination source to direct an illumination light path from the illumination source toward the image light path below the lens.

21 Claims, 5 Drawing Sheets

INTEGRATED OPTICAL IMAGING ASSEMBLY

FIELD OF THE INVENTION

This invention relates to scanner devices in general and more specifically to a scanner optical imaging assembly mounted on a single circuit board.

BACKGROUND

Optical scanner devices are well-known in the art and produce machine-readable image data signals that are representative of a scanned object, such as a photograph or a page of printed text. In a typical scanner application, the image data signals produced by an optical scanner may be used by a personal computer to reproduce an image of the scanned object on a suitable display device, such as a CRT or a printer. Some examples of optical scanner devices are fax machines, digital copiers, and computer scanners (flatbed and portable).

Optical scanners are well-known in the art and various components thereof are disclosed in U.S. Pat. No. 5,552,597 of McConica for "Hand-Held Scanner having Adjustable Light Path", U.S. Pat. No. 5,586,212 of McConica, et al., for "Optical Wave Guide for Hand-Held Scanner," U.S. Pat. No. 5,381,020 of Kochis, et al., for "Hand-Held Optical Scanner with Onboard Battery Recharging Assembly," and U.S. Pat. No. 5,306,908 of McConica, et al., for "Manually Operated Hand-Held Optical Scanner with Tactile Speed Control Assembly," all of which are hereby incorporated by reference for all that they disclose.

A typical optical scanner may include an optical imaging assembly comprising illumination, optical, and detection systems. The illumination source illuminates a portion of the object (commonly referred to as a "scan region"), whereas the optical system collects light reflected by the illuminated scan region and focuses a small area of the illuminated scan region (commonly referred to as a "scan line") onto the surface of a photosensitive detector positioned within the scanner. The photosensitive detector converts the image light incident thereon into electrical signals representative of the scan line. Image data representative of the entire object then may be obtained by sweeping the scan line across the entire object.

The term "image light" as used herein refers to the light reflected from the document and focused onto the surface of the detector array by the optical system. The image light may be converted into digital signals in essentially three steps. First, the photosensitive optical detector converts the light it receives into a varying electric current. Second, the varying electric currents from the detector elements are converted into analog voltages by an analog amplifier. Finally, the analog voltages are digitized by an analog-to-digital (A/D) converter. The digital data then may be processed and/or stored as desired.

While optical scanners of the type described above are being used, they are not without their problems. Image quality, scanner size and cost, and ease of assembly are related to the design and complexity of the optical imaging assembly. For example, the various components of the imaging assembly, i.e., the illumination source, the optical system and the detection system, must be precisely aligned to properly illuminate the document and focus the image light onto the detectors. The position, orientation, and distance of each element with respect to other elements must be correct to within close tolerances. Furthermore, the imaging assembly must be robust enough to resist shifting when the optical scanner is jolted or the operating environment varies.

If the illumination source is not properly aligned, the scan region may be too dark and the resulting image may lack contrast. If the image light is not properly focused and directed onto the detectors, the resulting image may be blurry or dark. Complex mounting and alignment systems may be employed to address these problems. However, a complex imaging assembly results in a relatively large, costly, and error prone optical scanner. Furthermore, the more complex the imaging assembly, the more difficult it is to assemble, and the more likely elements are to shift out of alignment.

Highly complex imaging assemblies also have a large tolerance stack. It is impossible to manufacture each part to the exact design measurements, therefore each part has a design tolerance, or an acceptable amount of error in size or shape. As parts are assembled together, the tolerance of each is added to a tolerance stack. Therefore, when elements of the imaging assembly are separated by a relatively large number of parts, the tolerance stack between the parts is relatively large, and the alignment error may be large enough to reduce image quality.

Consequently, a need exists for a smaller imaging assembly which is simple to assemble and align, resulting in a lower cost. A need further exists for an imaging assembly having a reduced tolerance stack to improve alignment and simplify assembly or repair.

SUMMARY

To assist in achieving the aforementioned needs, the inventors have devised an integrated optical imaging assembly which greatly simplifies assembly and alignment. This provides for smaller, lighter, and less expensive scanners in general.

An integrated optical imaging assembly for scanning an object having features of the present invention may comprise a mounting surface with an optical detector mounted thereto at a first end of an image light path. An optical system is mounted to the mounting surface and interposed in the image light path, and an illumination source is mounted to the mounting surface to illuminate a second end of the image light path.

The invention may also comprise an integrated optical imaging assembly which includes a printed circuit board having an upper end and a lower end. An optical detector is mounted to the upper end of the printed circuit board at a first end of an image light path, and a lens system is mounted to the printed circuit board below the optical detector to be interposed in the image light path. A reflector is mounted to the lens in the image light path between the lens and the optical detector to direct the image light path between the lens and the optical detector. An illumination source is mounted to the lower end of the circuit board to illuminate a second end of the image light path below the lens, and an illumination reflector is mounted to the lens opposite the illumination source to direct an illumination light path from the illumination source toward the image light path below the lens.

The invention may also comprise a method for producing an imaging system including connecting a photodetector to a circuit board, connecting an illumination source to the circuit board, and mounting an imaging lens on the circuit board between the photodetector and the illumination source.

BRIEF DESCRIPTION OF THE DRAWINGS

Illustrative and presently preferred embodiments of the invention are shown in the accompanying drawing, in which.

DESCRIPTION OF THE PREFERRED EMBODIMENT

Figure 1:
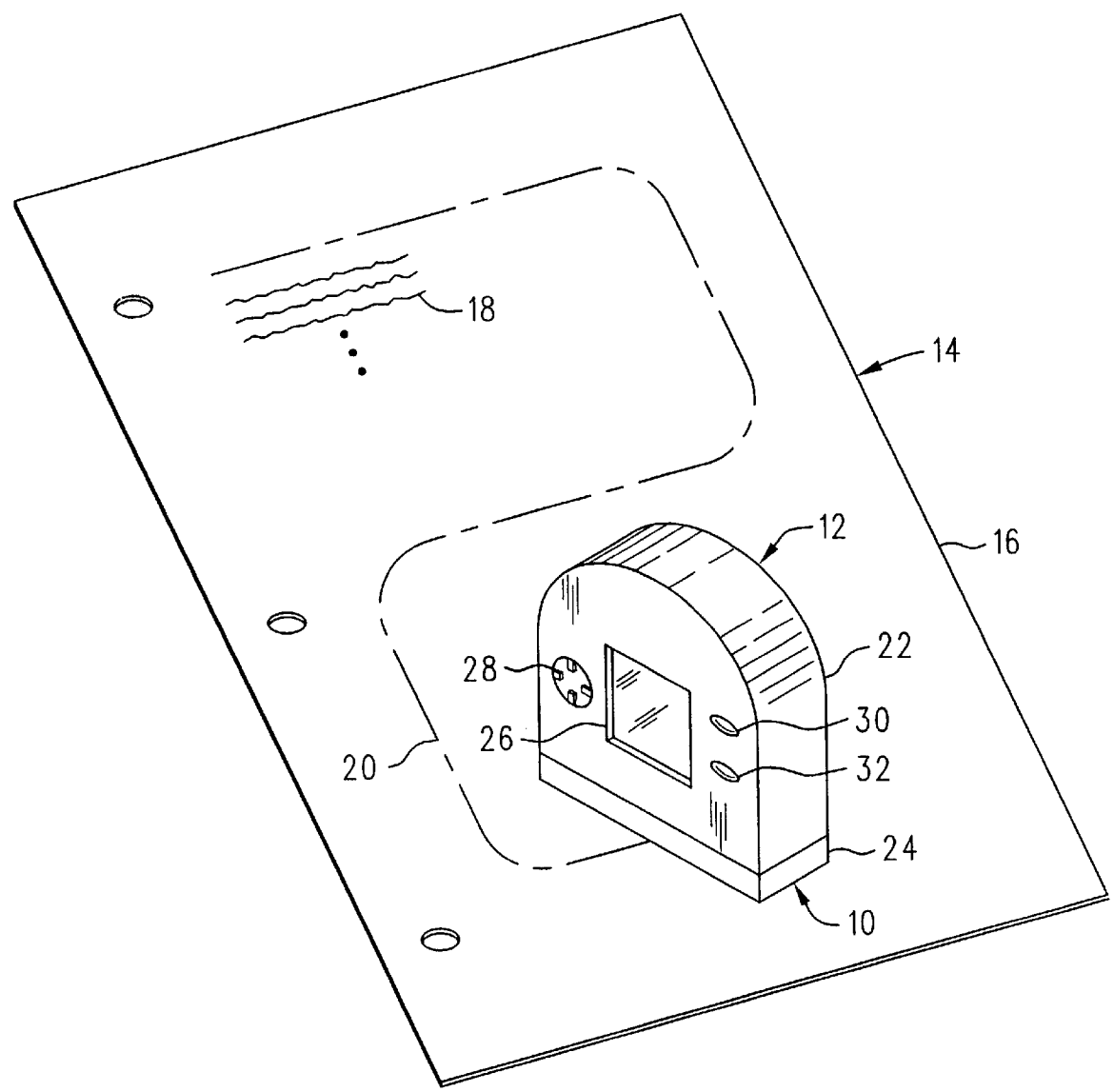
FIG. 1 is a perspective view of a portable scanner device having an integrated optical imaging assembly.

An integrated optical imaging assembly 10 according to the present invention may be used in a hand-held or portable image scanner 12 to scan an object 14, such as a document 16 with written text 18 provided thereon. For example, in the application illustrated in FIG. 1, the entire document 16 may be scanned by moving the portable image scanner 12 over the document 16 along a meandering or curvilinear scanning path 20. As will be explained in greater detail below, the integrated optical imaging assembly 10 associated with the portable image scanner 12 illuminates the document 16, then directs and detects the reflected image light to create a computer readable representation of the text 18 on the document 16. The integrated optical imaging assembly 10 significantly simplifies the alignment of the imaging components and reduces the required mounting hardware. The quality of the image data produced by the optical detector 42 is thereby generally improved. Assembly and repair of the scanner 12 is also simplified, and size, weight, and cost is reduced.

Figure 2:
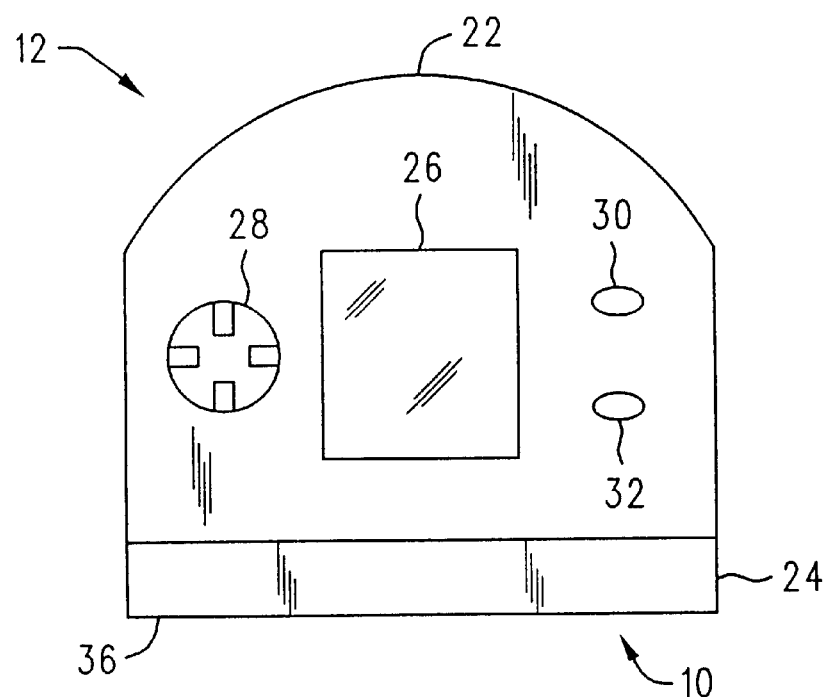
FIG. 2 is a front view of the portable scanner device shown in FIG. 1.
Figure 3:
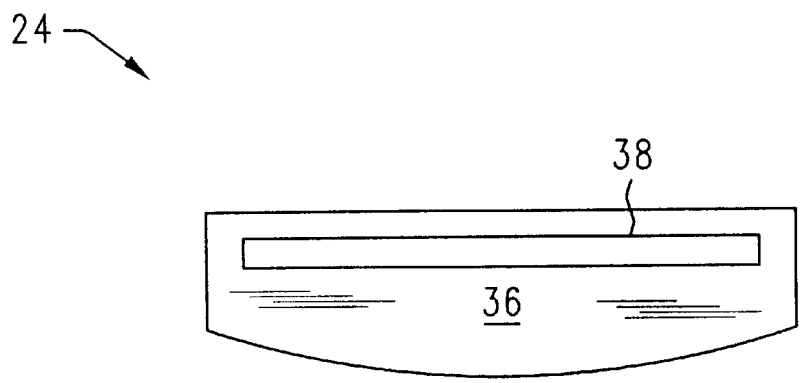
FIG. 3 is a bottom view of the portable scanner device showing the contact surface of the image head.

Referring now to FIG. 2, one embodiment of the portable image scanner 12 having an integrated optical imaging assembly 10 may comprise a main housing portion 22 having an image head portion 24 associated therewith. The main housing portion 22 of the portable image scanner 12 may be sized to receive the various electronic components and other devices (not shown) required for the operation of the portable image scanner 12. For example, in addition to housing the various electronic components that may be required or desired for the operation of the portable image scanner 12, the main housing portion 22 may also be provided with a display device 26, along with various buttons or switches 28, 30, and 32 to control the function and operation of the portable image scanner 12. The main housing portion 22 may also be sized to receive a suitable power source, such as a battery (not shown), to provide electrical power to the portable image scanner 12.

The image head portion 24 of portable image scanner 12 may be configured to receive an integrated optical imaging assembly 10. The face or contact surface 36 of the image head portion 24 may be provided with an elongate aperture or slot 38 therein which allows the integrated optical imaging assembly 10 to illuminate a scan region 66 (FIG. 5) on the document 16. The aperture or slot 38 also allows image light 62 reflected by the illuminated scan region 66 to be received by the integrated optical imaging assembly 10. The integrated optical imaging assembly 10 produces an image signal (not shown) based on the image light 62. Image data contained in the image signal may then be processed or manipulated by an image processing system (not shown) to produce image data that are representative of the object 14.

Figure 4:
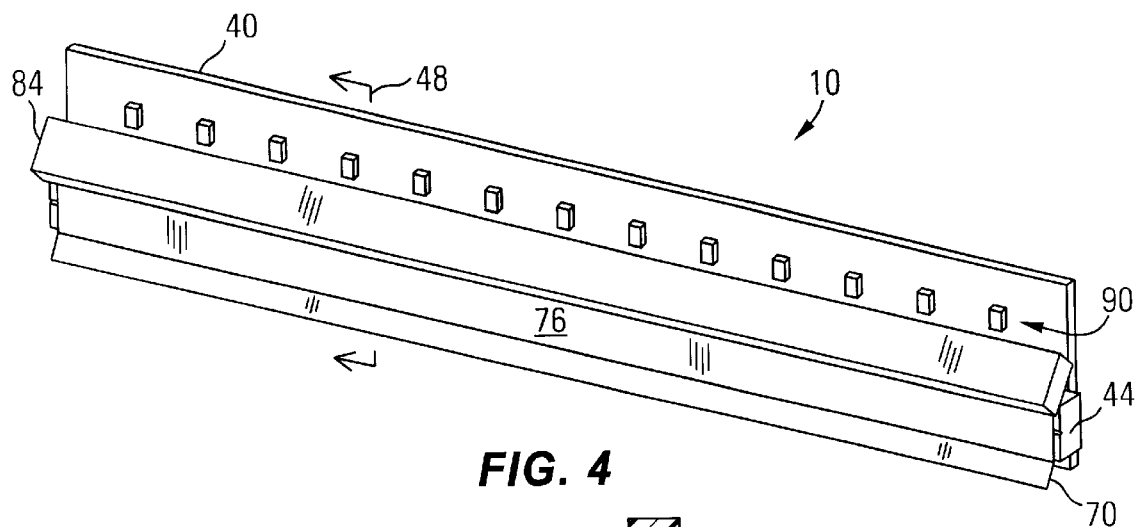
FIG. 4 is a perspective view of an integrated optical imaging assembly.
Figure 5:
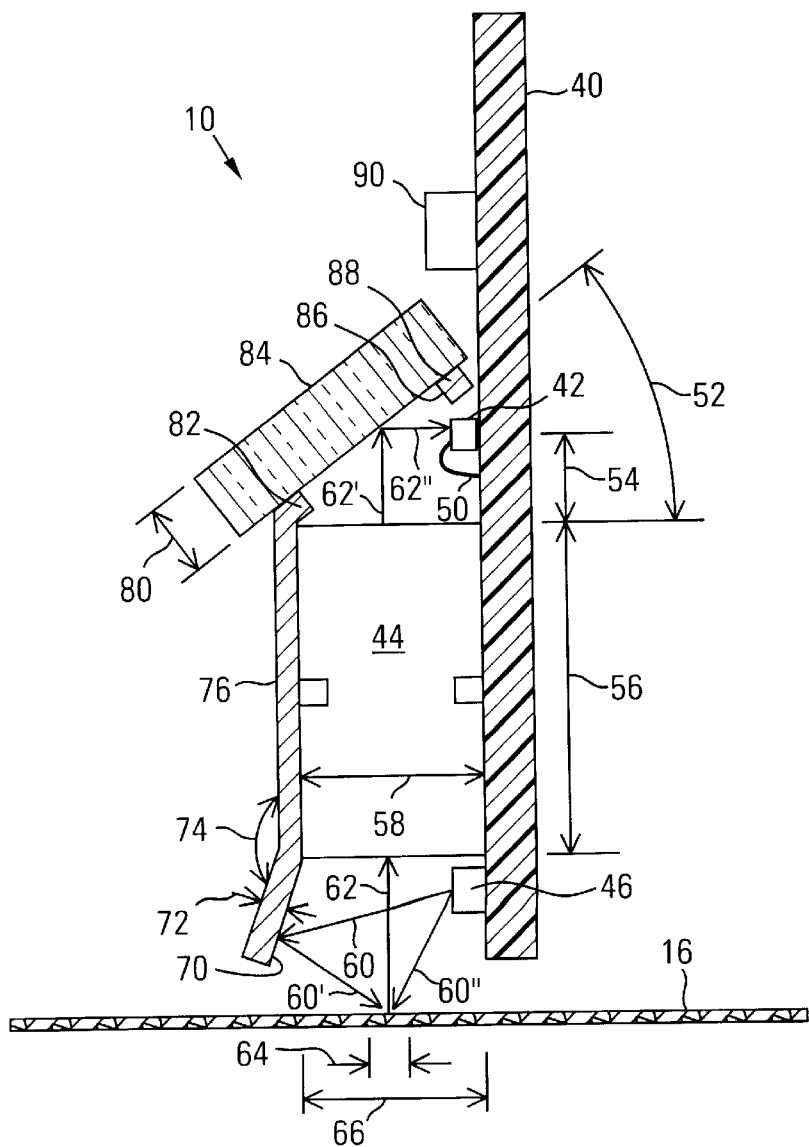
FIG. 5 is a cross-sectional side view of the integrated optical imaging assembly of FIG. 4 taken along line 48.
Figure 6:
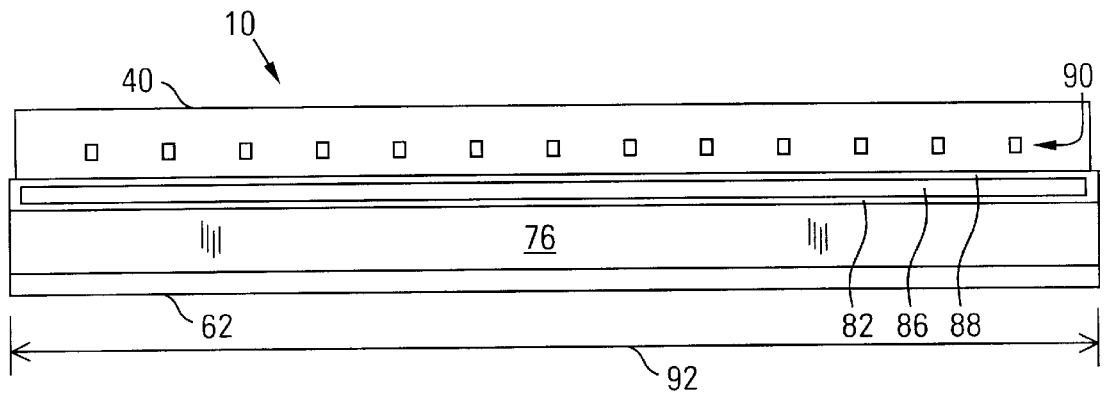
FIG. 6 is a front view of the integrated optical imaging assembly of FIG. 4 with the mirror removed.

As was briefly mentioned above, the integrated optical imaging assembly 10 illustrated in FIGS. 4, 5, and 6 significantly aids alignment and assembly by locating the imaging components on a single mounting surface 40. The imaging components may be mounted to the mounting surface 40 during one manufacturing process which may be automated, avoiding manual assembly and alignment.

The integrated optical imaging assembly 10 also significantly improves tolerance control by removing intermediate bodies such as multiple mounting brackets from the tolerance stack.

The integrated optical imaging assembly 10 may comprise an optical detector 42, an optical system 44, and an illumination source 46, all attached to a mounting surface 40. The integrated optical imaging assembly 10 of a preferred embodiment may also comprise a mirror 84 and an illumination reflector 70 to direct the image light 62 and illumination light 60. Signal conditioning components 90, such as resistors and capacitors, may also be mounted on the mounting surface 40. The illumination source 46 first illuminates a scan region 66 on the document 16. In a preferred embodiment, the illumination source 46 directs the illumination light 60 towards the illumination reflector 70, which reflects the illumination light 60 down to the scan region 66 at an angle. The illumination light 60 reflects off the document 16 as reflected image light 62. The intensity of the image light 62 varies as a function of the text 18 or graphics (not shown) on the document 16. Lighter areas on the document 16 reflect more intense image light 62 than dark areas.

The image light 62 is reflected from a scan line region 64 on the document 16 to the optical system 44 which focuses and directs it. In a preferred embodiment, the image light 62 travels from the optical system 44 to the mirror 84 which reflects it to the optical detector 42. The optical detector 42 converts the image light 62 into electrical signals which are representative of the text 18 or graphics on the document 16. The electrical signals may be further conditioned or processed by signal conditioning components 90 also mounted to the mounting surface 40.

In a preferred embodiment, the mounting surface 40 comprises a printed circuit board, to which the imaging components (e.g., the optical detector 42, optical system 44, and illumination source 46) may be hand mounted using mounting jigs and fixtures, or preferably, automatically mounted through the use of robotics during the manufacturing process. The method of component attachment may be solder, glue, clipping, heat staking, or any of a number of conventional attachment methods known in the art. This use of a unitary mounting surface greatly reduces the number of parts required in the scanner 12 and the manual labor involved in assembly and alignment, since the number of mounting and alignment components is reduced.

The portable image scanner 12 having an integrated optical imaging assembly 10 may be operated as follows to scan an object 14, such as document 16 with written text 18 thereon. As a first step, the user (not shown) would set up or initialize the portable image scanner 12 to perform the scanning operation by actuating the appropriate buttons or switches (e.g., 28, 30, and 32) in accordance with the particular operational sequence for the specific scanner device. The user may then place the contact surface or face 36 of the portable image scanner 12 against the document 16 and initiate the scanning operation. The user then moves the portable image scanner 12 across the document 16 as the integrated optical imaging assembly 10 produces an electrical representation of the document 16.

Having briefly described the integrated optical imaging assembly 10 and its use in a portable image scanner 12, as well as some of its more significant features and advantages, the various embodiments of the integrated optical imaging assembly 10 will now be described in detail. However, before proceeding with the detailed description it should be noted that while the integrated optical imaging assembly 10 is shown and described herein as it could be used in a portable image scanner 12, it is not limited to use with any particular type or style of scanner device. For example, the integrated optical imaging assembly 10 could also be used in a flatbed scanner or fax machine. It should also be noted that while the portable image scanner 12 is shown and described herein as it may be used to scan an object 14, such as a document 16 with written text 18 thereon, it is not limited to use with any particular type of object 14. Indeed, the portable image scanner 12 may be used to scan almost any type of object imaginable. Accordingly, the integrated optical imaging assembly 10 according to the present invention should not be regarded as limited to the particular type of portable scanner device and applications shown and described herein.

With the foregoing considerations in mind, one embodiment of the integrated optical imaging assembly 10 is shown and described herein as it could be used in a portable or hand-held image scanner 12 which may be used to scan an object 14, such as a document 16 with written text 18 thereon. See FIG. 1. In order to scan the entire document 16, it may be necessary for the user to move the portable image scanner 12 along a curvilinear or meandering scanning path 20. If so, the portable scanner device 12 may be provided with a navigation system (not shown) to allow image data (not shown) obtained along the meandering or curvilinear scanning path 20 to be "stitched" together to provide image data representative of the entirety of the scanned object 14. Exemplary navigation systems and stitching algorithms are disclosed in U.S. Pat. No. 5,089,712 of Holland for "Sheet Advancement Control System Detecting Fiber Pattern of Sheet" and U.S. Pat. No. 5,578,813 of Allen, et al., for "Freehand Image Scanning Device which Compensates for Non-Linear Movement," both of which are specifically incorporated herein by reference for all that they disclose. However, since the details of the navigation system and stitching algorithm that may be used in such a portable image scanner 12 are not necessary to understand or practice the present invention, the particular navigation system and stitching algorithm that may be utilized a portable image scanner 12 will not be described in further detail herein.

Referring now primarily to FIGS. 1–2, a portable image scanner 12 employing an integrated optical imaging assembly 10 may be provided with a main housing portion 22 and an image head portion 24. The main housing portion 22 may comprise an overall configuration or shape conducive to hand manipulation by a user (not shown), although other configurations may also be used. In one preferred embodiment, the main housing portion 22 may be sized to receive the various electronic components (not shown) required for the operation of the portable image scanner 12. Alternatively, some or all of the various electronic components may be located elsewhere and may be connected to the main housing portion 22 by a suitable link, such as a cable (not shown). The main housing portion 22 may also be provided with a display device 26 and various switching devices 28, 30, and 32 that may be required or desired for the operation of the portable image scanner 12. While the switching devices 28, 30, and 32 in one preferred embodiment are located on the front face of the main housing portion 22 of the portable image scanner 12, they may be positioned at any convenient location on the scanner 12. The electrical power required to operate the portable image scanner 12 may be provided by a suitable electrical power source, such as a battery (not shown), that may also be contained within the main housing portion 22 of the portable image scanner 12. However, since the various electronic components, display devices, switching devices, and batteries that may be required or desired for use in a particular portable image scanner are well-known in the art and since descriptions of the various components are not required to understand or practice the present invention, the various components, e.g., electronic components (not shown), display device 26, switching devices 28, 30, and 32, etc., utilized in one preferred embodiment of the portable image scanner 12 will not be described in further detail herein.

The main housing portion 22 of the portable image scanner 12 may be made from any of a wide range of materials, such as metals or plastics, suitable for the intended application. By way of example, in one preferred embodiment, the main housing portion 22 is made of polycarbonate plastic, although other materials could also be used.

The image head portion 24 may be sized to receive an integrated optical imaging assembly 10, as illustrated in FIGS. 4, 5, and 6. In a preferred embodiment, the integrated optical imaging assembly 10 comprises an optical detector 42, an optical system 44, and an illumination source 46 mounted on a mounting surface 40. The mounting surface 40 may comprise a printed circuit board containing the electrical wiring to connect the various elements of the integrated optical imaging assembly 10. This also provides the benefit of aiding in component alignment, since the electrical traces and solder pads on a printed circuit board are precisely positioned, providing a precise reference to position the components on the board. Furthermore, the electrical components may be mounted and soldered to the printed circuit board by automated machinery, speeding assembly and lowering costs while correctly aligning the components.

The optical detector 42 may comprise a contact image sensor (CIS), an array of individual photodetectors, or an integrated photodetector such as a charge-coupled device (CCD). A typical individual photodetector changes electrical resistance in response to exposure to light. As the intensity of the light reflected from the image onto the photodetector changes, the electrical current passing through the photodetector varies. Thus a photodetector may be used to detect light and dark regions on an image. Similarly, a charge-coupled device is a semiconductor device which builds up an electrical charge in areas exposed to light. The varying electrical charge distributed across the two-dimensional face of the semiconductor thus contains an electrical representation of the varying light intensity across the face. The light detection surface of a CCD is smaller than the detection area of a document, therefore a CCD generally requires a relatively elaborate optical system to reduce and focus the image light onto the CCD. In contrast, a CIS has substantially the same dimensions as the target area to be detected on the document, so the image light only needs to be directed from the document to the CIS without reduction.

In a preferred embodiment, the optical detector 42 comprises a contact image sensor (CIS). Alternatively, other types of detectors having the same or other resolutions could also be used. The optical detector 42 is preferably connected to the printed circuit board 40 with one or more wire-bonds 50, fine uninsulated electrical wires which are soldered to the printed circuit board 40 by automated machinery.

An illumination source 46 is also mounted to the printed circuit board 40 to illuminate a scan region 66 on a document 16 positioned under the integrated optical imaging assembly 10. The illumination source 46 may comprise an array of light emitting diodes (LED's) which may be positioned in spaced-apart relation on the printed circuit board 40. The array of LED's in the illumination source 46 may have a length that is substantially coextensive with the integrated optical imaging assembly 10, which is likewise substantially coextensive with the length of the scan line 64 that is to be provided. In one preferred embodiment, the integrated optical imaging assembly 10 may have a length 92 in the range of about 120 mm to about 130 mm (123.2 mm preferred), although other lengths could also be used. Each light emitting diode in the illumination source 46 may comprise an LED part number HSMA-S690, available from Hewlett-Packard Company of Palo Alto, Calif. The number of light emitting diodes provided in the illumination source 46 will depend on the length 92 of the integrated optical imaging assembly 10 as well as on the desired intensity of the illumination that is to be provided to the scan region 66. By way of example, in one preferred embodiment, the illumination source 46 may be provided with eighteen (18) separate light emitting diodes. The light emitting diodes in the illumination source 46 utilized in one preferred embodiment produce a substantially uniform light output over a wide angle, nearly 180° in some cases. The illumination source 46 illuminates a scan region 66 on a document 16 positioned under the integrated optical imaging assembly 10. The illumination source 46 preferably illuminates the scan region 66 at multiple angles.

Alternatively, the illumination source 46 may comprise any of a wide variety of light sources now known or that may be developed in the future that are suitable for use with the integrated optical imaging assembly 10. Illumination source selection must take into account the type of optical detector 42, the document 16 type, the power, light intensity, and light wavelength requirements, etc. For example, an alternate illumination source 46 may comprise a fluorescent lamp.

The illumination source 46 may be surface mounted or wire bonded to the printed circuit board 40, or may be connected by any other suitable means.

An optical system 44 may be used to direct and focus the image light 62 toward the surface of the optical detector 42. The optical system 44 may comprise any of a wide variety of imaging systems suitable to direct and focus the image light 62, such as typical lens systems or projection imaging systems involving lenses and/or reflectors. For example, the optical system 44 may comprise a microlens array mounted to the printed circuit board 40.

In a preferred embodiment, the optical system 44 comprises a rod lens array, or gradient index lens. A gradient index (GRIN) lens comprises an array of glass or plastic tubes mounted side by side in a single housing. Each tube directs light by refraction due to a refractive index which smoothly varies from the center of the tube out to the edges. In a preferred embodiment, the optical system 44 may comprise a GRIN lens such as the type sold under the name SELFOC which is a registered trademark of the Nippon Sheet Glass Company, Limited, having a height 56 of about 6.9 mm and a width 58 of about 3.8 mm. The optical system 44 is mounted to the printed circuit board 40 between the optical detector 42 and the illumination source 46 at a distance 54 below the optical detector 42 between about 2.17 mm and about 2.27 mm (2.22 mm preferred). The optical system 44 may be mounted to the printed circuit board 40 using an adhesive layer or by any other suitable means.

To aid in directing illumination light 60 and image light 62, the integrated optical imaging assembly 10 may also comprise an illumination reflector 70 and a mirror 84. For example, the optical detector 42 has a detection field, or a field of view, which is directed away from the printed circuit board 40 rather than down toward the scan region 66 on the document 16 when the optical detector 42 is mounted to the printed circuit board 40. The mirror 84 reflects the image light 62' emerging from the optical system 44 toward the detection field of the optical detector 42.

In a preferred embodiment, a reflector mount 76 is mounted to the optical system 44 opposite the printed circuit board 40. The illumination reflector 70 is attached to the lower end of the reflector mount 76 opposite the illumination source 46, while the mirror 84 is attached to the upper end of the reflector mount 76 opposite the optical detector 42. In a preferred embodiment, the reflector mount 76, illumination reflector 70, and a mirror mount 82 and 86 are integrally formed of sheet metal having a thickness 72 of about 0.5 mm. The reflector mount 76 is bent to an angle 74 of about 135 degrees to form the illumination reflector 70, and to an angle 52 of about 45 degrees to form the mirror mount 82 and 86.

The illumination reflector 70 preferably comprises a polished surface of the sheet metal used to form the reflector mount 76, illumination reflector 70, and mirror mount 82 and 88. Alternatively, the illumination reflector 70 may comprise a mirror (not shown) attached to the reflector mount 76.

Alternatively, the reflector mount 76 may be molded of plastic with an illumination reflector 70 and a mirror mount 82 and 88, with an illumination mirror (not shown) and an image light mirror 84 mounted thereon.

The image light mirror 84 in a preferred embodiment comprises a front surface glass substrate mirror having a thickness 80 of about 1.9 mm. A front surface mirror may aid in the layout of the integrated optical imaging assembly 10 and typically has a higher reflectivity than a rear surface mirror, but may have a higher cost. The mirror 84 may comprise either a front surface mirror or a rear surface mirror, or any other suitably reflective surface, according to the needs of the scanner designers.

The mirror 84 may be mounted to the mirror mount 82 and 88 portion of the reflector mount 76 by a thin adhesive layer or by metal tabs on the reflector mount 76 bent around the edges of the mirror 84. The mirror mount comprises a lower support surface 82 and an upper support surface 88, forming a cutout region 86 in the reflector mount 76. The mirror 84 is mounted to the upper and lower support surfaces 88 and 82 so that the image light 62' may pass through the cutout 86 to reflect from the mirror 84. Alternatively, the mirror 84 may be mounted to the reflector mount 76 in any suitable fashion to maintain the correct position and angle 52.

The mirror 84 may add an additional benefit of reducing stray light incident on the optical detector 42. By positioning the upper support 88 of the reflector mount 76 and the mirror 84 as closely as possible to the printed circuit board 40, stray light reflected inside the image head 24 is prevented from reaching the optical detector 42. The optical detector 42 may thereby be surrounded by the printed circuit board 40, the optical system 44, and the mirror 84 in a substantially closed configuration. The quality of the resulting scanned image produced by the integrated optical imaging assembly is dependent upon the quality and purity of the image light 62 reaching the optical detector 42. Reducing stray light incident on the optical detector 42 thus improves the overall image quality.

Alternatively a prism (not shown) could be used in place of the mirror 84 to fold the image light path 62', internally reflecting the image light 62'. In another alternative embodiment, a refractive element could be used to fold the image light path 62' refractively.

During operation of the integrated optical imaging assembly 10, the illumination source 46 produces illumination light 60 to illuminate the scan region 66 on the document 16. The scan region 66 is illuminated by light rays traveling directly from the illumination source 46 to the document 16 (e.g., 60") and by light rays reflecting from the illumination reflector 70 (e.g., 60'). Image light 62 is reflected from the illuminated scan line 64 inside the scan region 66 on the document 16 and travels to the optical system 44. Focused and directed image light 62' emerges from the optical system 44 and is reflected by the mirror 84 toward the optical detector 42. The image light traveling toward the mirror 84 (e.g., 62 and 62') may be substantially parallel to the mounting surface 40, while the image light 62" traveling from the mirror 84 to the optical detector 42 may be substantially perpendicular to the mounting surface 40. The optical detector 42 then converts the reflected image light 62" into electrical signals representing the light and dark patterns on the scan line 64.

The integrated optical imaging assembly 10 may also comprise signal conditioning components 90 mounted to the printed circuit board 40 to condition the electrical signals from the optical detector 42 and the electrical power provided to the illumination source 46. The signal conditioning components 90 may comprise electrical components such as resistors and capacitors, preferably miniature surface mount components.

Figure 7:
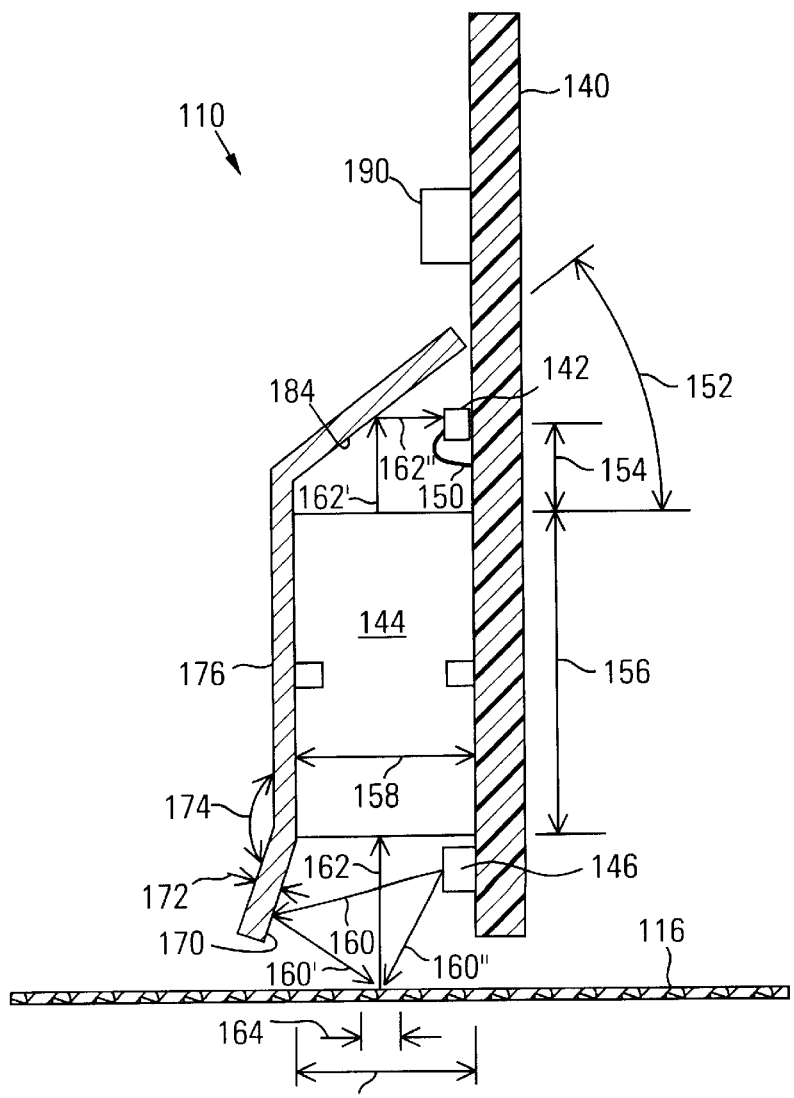
FIG. 7 is a cross-sectional side view of an integrated optical imaging assembly having a metal image light reflector.

In an alternative embodiment, illustrated in FIG. 7, an integrated optical imaging assembly 110 may include a mounting surface 140 comprising a printed circuit board, with an optical detector 142, an optical system 144, and an illumination source 146 mounted thereon. The optical detector 142 may comprise a CIS mounted to the printed circuit board 140 with a plurality of wire bonds 150. The optical system 144 may comprise a GRIN lens having a height 156 of about 6.9 mm and a width 158 of about 3.8 mm. The optical system 144 is mounted to the printed circuit board 140 between the optical detector 142 and the illumination source 146 at a distance 154 below the optical detector 142 between about 2.17 mm and about 2.27 mm (2.22 mm preferred). The illumination source 146 preferably comprises an array of 18 LED's mounted to the printed circuit board 140 below the optical system 144.

A reflector mount 176 is mounted to the optical system 144 opposite the printed circuit board 140, having an illumination reflector 170 and an image light reflector 184 connected thereto. The reflector mount 176, the illumination reflector 170 and the image light reflector 184 may be integrally formed of sheet metal having a thickness 172 of about 0.5 mm. The angle 152 between the reflector mount 176 and the image light reflector 184 may be about 45 degrees, and the angle 174 between the reflector mount 176 and the illumination reflector 170 may be about 135 degrees. The bends in the sheet metal 152 and 174 may be formed in a stamping operation or other bending process.

The illumination reflector 170 and the image light reflector 184 may comprise polished surfaces on the sheet metal or any other reflective surface such as a reflective coating or a glass substrate mirror mounted to the reflector mount 176. The reflector mount 176 may be mounted to the optical system 144 with a thin adhesive layer or with any other suitable mounting means, such as heat staking, clips, or screws. To heat stake the reflector mount 176 to the optical system 144, small plastic tabs (not shown) may extend from the optical system 144 through corresponding holes in the reflector mount 176, where they are melted to increase the width of the plastic tabs, preventing them from withdrawing through the holes in the reflector mount 176.

A plurality of signal conditioning components 190 may also be mounted to the printed circuit board 140 to condition or process the electrical signals to and from the illumination source 146 and the optical detector 142.

During operation of the integrated optical imaging assembly 110, the illumination source 146 produces light rays (e.g., 160 and 160") to illuminate a scan region 166 on the document 116 positioned below the integrated optical imaging assembly 110. The illumination source 146 may direct light rays through an angle of up to 180 degrees, thus some light rays (e.g., 160") may reach the scan region 166 directly, while other light rays (e.g., 160 and 160') are reflected from the illumination reflector 170 to the scan region 166.

Image light 162 is reflected from a scan line 164 in the scan region 166 on the document 116 to the optical system 144. The optical system 144 focuses and directs the image light 162' up to the image light reflector 184, and reflected image light 162" travels from the image light reflector 184 to the optical detector 142. The optical detector 142 then produces electrical signals representative of the scan line 164, and the electrical signals may then be conditioned or processed by the signal conditioning components 190.

Figure 8:
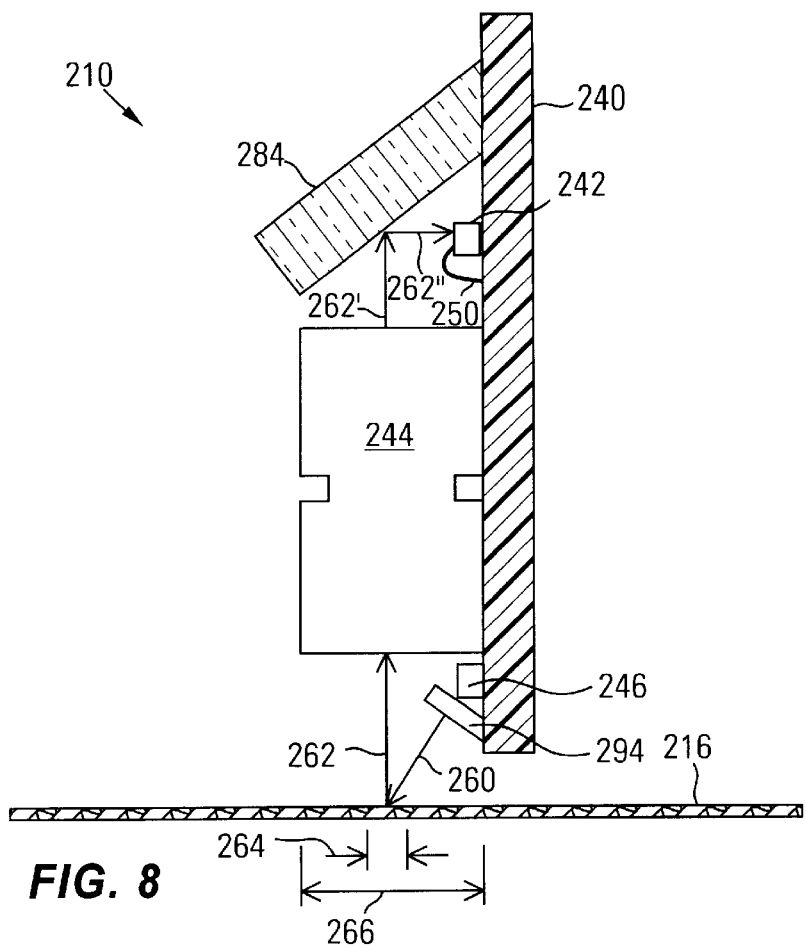
FIG. 8 is a cross-sectional side view of an integrated optical imaging assembly having a lens to direct the illumination light towards the scan region and having the image light reflector mounted on the printed circuit board.

In an alternative embodiment of an integrated optical imaging assembly 210, illustrated in FIG. 8, an optical detector 242, an optical system 244 and a illumination source 246 are mounted to a mounting surface 240 as in other embodiments discussed previously. The mounting surface 240 may comprise a printed circuit board or other rigid substrate, with the optical system 244 preferably connected by a plurality of wire bonds 250.

A mirror 284 may be mounted to the mounting surface 240 above the optical system 244 to angle down over the optical detector 242. An illumination lens 294 may be mounted below the illumination source 246 to direct the illumination light 260 toward a scan region 266 on a document 216 positioned below the integrated optical imaging assembly 210. The illumination lens 294 is preferably mounted to the mounting surface 240. Alternatively, the illumination lens 294 may be mounted to the illumination source 246.

Figure 9:
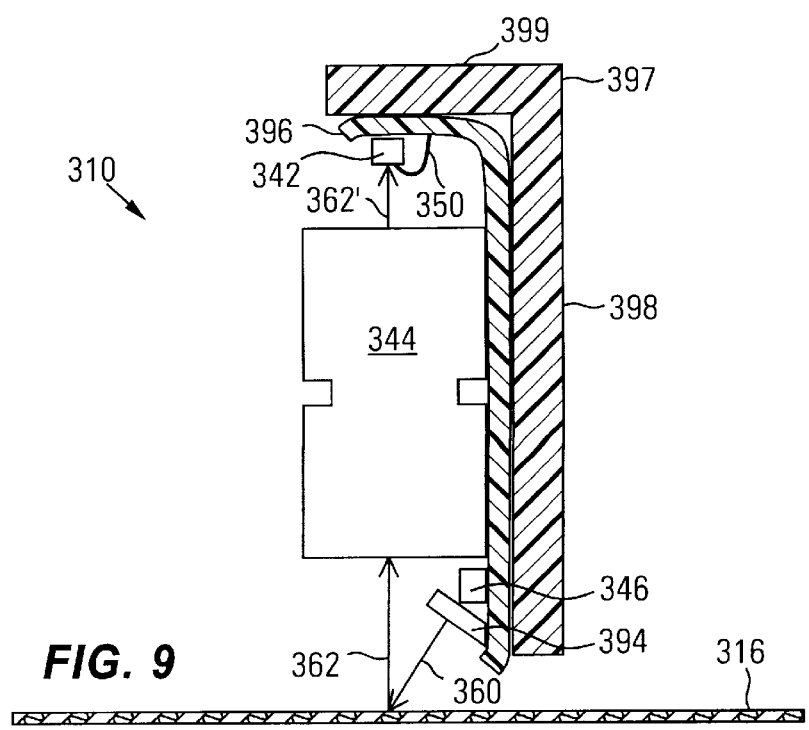
FIG. 9 is a cross-sectional side view of an integrated optical imaging assembly having a flexible printed circuit mounted on a mounting bracket.

In another embodiment of an integrated optical imaging assembly 310 illustrated in FIG. 9, a flexible printed circuit 396 is mounted to a rigid mounting bracket 397. The mounting bracket 397 comprises a top portion 399 and a side portion 398, with the flexible printed circuit 396 bending to mount to both the top and side portions 399 and 398.

An optical detector 342 is connected with a plurality of wire bonds 350 to the portion of the flexible printed circuit 396 that is mounted to the top portion 399 of the mounting bracket 397. The top portion 399 of the mounting bracket 397 is substantially parallel to a document 316 positioned below the integrated optical imaging assembly 310. As a result, the detection field of the optical detector 342 is directed toward the document 316 and the image light 362' need not be reflected.

An optical system 344 is mounted to the flexible printed circuit 396 on the portion of the flexible printed circuit 396 that is mounted to the side portion 398 of the mounting bracket 397. The optical system 344 is positioned so that an optical axis of the optical system 344 is aligned below the optical detector 342 directly in the detection field of the optical detector 342.

An illumination source 346 is located between the optical system 344 and the document 316, and is connected to the flexible printed circuit 396 on the portion of the flexible printed circuit 396 that is mounted to the side portion 398 of the mounting bracket 397. An illumination lens 394 is mounted below the illumination source 346. The illumination lens 394 is preferably mounted to the flexible printed circuit 396. Alternatively, the illumination lens 394 may be mounted to the illumination source 346.

During operation of the integrated optical imaging assembly 310, the illumination source 346 produces illumination light 360 which is directed by the illumination lens 394 toward the document 316. Image light 362 is reflected from the document 316 toward the optical system 344. The optical system 344 focuses and directs the image light 362' onto the optical detector 342, which produces electrical signals representative of the image light 362.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. An optical imaging assembly, comprising:

a mounting surface;

an optical detector mounted to said mounting surface at a first end of an image light path;

an optical system mounted to said mounting surface and interposed in the image light path; and an illumination source mounted to said mounting surface for illuminating a second end of the image light path.

2. The optical imaging assembly of claim 1, wherein said mounting surface comprises a printed circuit board.

3. The optical imaging assembly of claim 1, further comprising a mounting bracket having a side portion and a top portion, said top portion extending from said side portion, and wherein said mounting surface comprises a flexible printed circuit attached to said mounting bracket.

4. The optical imaging assembly of claim 1, wherein said optical detector comprises a contact image sensor.

5. The optical imaging assembly of claim 1, wherein said optical detector comprises an array of photodetectors.

6. The optical imaging assembly of claim 1, wherein said optical detector comprises a charge-coupled device.

7. The optical imaging assembly of claim 1, wherein said optical system comprises a gradient index lens.

8. The optical imaging assembly of claim 1, wherein said optical system comprises at least one shaped optical lens.

9. The optical imaging assembly of claim 8, wherein said shaped optical lens comprises a cylindrical lens.

10. The optical imaging assembly of claim 1, wherein said illumination source comprises an array of light emitting diodes.

11. The optical imaging assembly of claim 1, wherein said illumination source comprises at least one fluorescent light.

12. The optical imaging assembly of claim 1, further comprising a reflector mounted to said mounting surface to change the direction of the image light path between said optical system and said optical detector.

13. The optical imaging assembly of claim 1, further comprising a reflector mounted to said optical system to change the direction of the image light path between said optical system and said optical detector.

14. The optical imaging assembly of claim 13, wherein said reflector comprises a glass substrate mirror.

15. The optical imaging assembly of claim 13, wherein said reflector comprises a polished metal surface.

16. The optical imaging assembly of claim 1, further comprising an illumination reflector mounted to said optical system to direct an illumination light path from said illumination source onto the image light path.

17. The optical imaging assembly of claim 1, wherein the illumination reflector comprises a polished metal surface.

18. The optical imaging assembly of claim 1, further comprising a lens mounted to said illumination source to direct an illumination light path from said illumination source onto the image light path.

19. The optical imaging assembly of claim 1, further comprising a lens mounted to said mounting surface to direct an illumination light path from said illumination source onto the image light path.

20. The optical imaging assembly of claim 1, further comprising signal conditioning elements mounted to said mounting surface for conditioning an electrical signal produced by said optical detector.

21. An optical imaging assembly, comprising:

a printed circuit board having an upper end and a lower end;

an optical detector mounted to the upper end of said printed circuit board at an end of an image light path;

a lens mounted to said printed circuit board below said optical detector and interposed in the image light path;

a reflector mounted to said lens in the image light path between said lens and said optical detector for directing the image light path between said lens and said optical detector;

an illumination source mounted to the lower end of said printed circuit board for illuminating a second end of the image light path below said lens; and an illumination reflector mounted to said lens opposite said illumination source for directing an illumination light path from said illumination source toward the image light path below said lens.

* * * * *